(12) United States Patent
Hashimoto et al.

(10) Patent No.: US 6,700,234 B2
(45) Date of Patent: Mar. 2, 2004

(54) ELECTROMAGNETIC DEVICE

(75) Inventors: Naoya Hashimoto, Tokyo (JP); Teruo Miyaoku, Tokyo (JP); Shiro Hasegawa, Tokyo (JP); Chiaki Sugano, Tokyo (JP); Hiromasa Ozawa, Tokyo (JP); Hirohisa Ohta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/892,845

(22) Filed: Jun. 28, 2001

(65) Prior Publication Data

US 2002/0050745 A1 May 2, 2002

(30) Foreign Application Priority Data

Oct. 26, 2000 (JP) ......................... 2000-327223

(51) Int. Cl.⁷ ................. H02K 15/12; H02K 1/04; H02K 17/00
(52) U.S. Cl. ................. 310/45; 310/208; 310/43
(58) Field of Search .............. 310/43, 208, 45, 310/42; 29/596, 598

(56) References Cited

U.S. PATENT DOCUMENTS

| | | | |
|---|---|---|---|
| 3,652,778 A | * 3/1972 | Sakai | 174/28 |
| 4,275,319 A | 6/1981 | Davis, Jr. | 310/43 |
| 4,378,407 A | 3/1983 | Yamamoto et al. | 428/383 |
| 4,388,371 A | * 6/1983 | Bolon et al. | 428/383 |
| 5,319,269 A | 6/1994 | Bryant | 310/43 |
| 5,691,058 A | * 11/1997 | Miyao et al. | 428/379 |
| 5,969,456 A | 10/1999 | Okamoto et al. | 310/196 |
| 6,159,600 A | * 12/2000 | Ryang et al. | 428/379 |

FOREIGN PATENT DOCUMENTS

| | | | |
|---|---|---|---|
| JP | 58-25010 A | 2/1983 | |
| JP | 61-108052 U | 7/1986 | H02K/3/44 |
| JP | 62-290332 A | 12/1987 | H02K/3/44 |
| JP | 5-276710 | 10/1993 | |
| JP | 06-121481 A | 4/1994 | H02K/3/46 |
| JP | 8-191561 | 7/1996 | |

* cited by examiner

*Primary Examiner*—Karl Tamai
*Assistant Examiner*—Guillermo Perez
(74) *Attorney, Agent, or Firm*—Sughrue Mion, PLLC

(57) ABSTRACT

An electromotive device includes an outer casing, a shaft supported by the outer casing, a bobbin disposed inside the outer casing so as to be disposed around the shaft on a common axis with the shaft, and a coil embedded in an outer molding, the coil being constructed by winding a conducting wire onto the bobbin, the bobbin and the outer molding being composed of an epoxy resin, which is an electrically-insulating material resistant to permeation by sulfur compounds.

5 Claims, 6 Drawing Sheets

PRIOR ART

PRIOR ART

PRIOR ART

US 6,700,234 B2

ELECTROMAGNETIC DEVICE

This application is based on Application No. 2000-327223, filed in Japan on Oct. 26, 2000, the contents of which are hereby incorporated by reference.

BACKGROUND OF THE INVENTION

1. Field of the Invention

The present invention relates to an electromagnetic device such as a stepping motor, a solenoid valve, or the like, used in an automotive continuously variable transmission, for example.

2. Description of the Related Art

FIG. 4 is an external view of a permanent-magnet stepping motor, FIG. 5 is a cross section taken along line V—V in FIG. 4, FIG. 6 is a cross section taken along line VI—VI in FIG. 5, FIG. 7 is a cross section taken along line VII—VII in FIG. 5, and FIG. 8 is a partial exploded perspective of the stepping motor in FIG. 5.

In the figures, a permanent-magnet (PM) stepping motor 1, which is immersed and used in an oil, includes: an outer casing 2 made of a resin; a tubular housing 12 made of a resin which is linked to the outer casing 2; a motor main body 3 disposed inside the outer casing 2; a shaft 4 functioning as a moveable shaft rotated by the motor main body 3; and a conversion mechanism 31 for converting rotation of the shaft 4 into rectilinear motion. Moreover, the outer casing 2 and the housing 12 constitute a cover.

The motor main body 3 includes a pair of stators 5 secured to the outer casing 2, and a rotor 6 secured to the shaft 4. The stators 5 have: coils 7 which are each constructed by winding a conducting wire in which an electrically-insulating layer is formed on a copper wire surface; coil terminals 8 led out from the coil 7; connector terminals 9 connected to the coil terminals 8; and an external connector 25 connected to the connector terminals 9. The rotor 6 has a bush 10 secured to the shaft 4, and a circumferentially-magnetized hollow cylindrical permanent magnet 11 fitted over and secured to the bush 10.

The housing 12 is fastened to the outer casing 2 by a plurality of screws 12A extending parallel to the shaft 4. A circular interfitting aperture 2a is formed in the outer casing 2, and an interfitting portion 12a for inserting into the interfitting aperture 2a is formed on the housing 12. As shown in FIG. 6, three positioning projections 12b, which protrude radially and come into contact with an inner circumferential surface of the interfitting aperture 2a, are formed on an outer circumferential surface of the interfitting portion 12a. Furthermore, an annular groove 12c is formed in a joining surface of the housing 12, where the housing 12 joins the outer casing 2.

A housing communicating aperture 12d communicating between internal and external portions of the housing 12 is disposed in a side surface portion of the housing 12. A filter 13 for catching contaminants contained in the oil is disposed in the housing communicating aperture 12d. The shaft 4 is rotatably held by a casing bearing 14 and a housing bearing 15. The housing bearing 15, which is secured inside the housing 12, is a rubber-seal type.

A rod 16 reciprocated in an axial direction of the shaft 4 by rotation of the shaft 4 is disposed at a tip portion of the housing 12. A base-end portion of the rod 16 is inserted inside the housing 12, and a tip portion of the rod 16 protrudes from the tip portion of the housing 12. A rod communicating aperture 16a communicating between the internal portion of the housing 12 and an internal portion of the rod 16 is formed in the rod 16. A sleeve 17 for guiding rectilinear motion of the rod 16, an oil seal 18 for preventing penetration of contaminants from an outer circumferential portion of the rod 16, and a ring-shaped stopper 19 for regulating progression of the rod 16 are each secured to an inner circumferential surface of the tip portion of the housing 12.

The conversion mechanism 31 includes a thread portion 4a, a guide member 20 made of a resin which is formed in the base-end portion of the rod 16 and is engaged with the thread portion 4a, and a stopper 21 made of a metal which is secured to the shaft 4 and regulates regression of the rod 16. Stopper surfaces 20b and 21a which are perpendicular to the direction of rotation of the shaft 4 are formed on the guide member 20 and the stopper 21, respectively. As shown in FIG. 7 a rotation-regulating projection portion 20a which protrudes radially and regulates rotation of the rod 16 is formed on an outer circumferential portion of the guide member 20. Consequently, the guide member 20 is displaced in an axial direction of the shaft 4 by rotation of the shaft 4. An operating member 22 made of a resin is mounted to the tip portion of the rod 16.

A construction of each of the stators 5 will now be explained in detail with reference to FIGS. 9 to 12.

As shown in FIG. 10, the coils 7 are each constructed by winding a conducting wire 50, shown in FIG. 9, formed by coating a copper wire 51 with an electrically-insulating layer 52 composed of a polyimide resin, which is a thermoplastic resin, onto a bobbin 53 composed of nylon, which is a thermoplastic resin, for a predetermined number of winds. Then, end portions of the conducting wire 50 of each coil 7 are connected to the coil terminals 8 mounted to the bobbin 53. Furthermore, as shown in FIG. 11, the coil 7 wound onto the bobbin 53 is embedded in an outer molding 54 composed of nylon, which is a thermoplastic resin. In addition, as shown in FIG. 12, cores 55 made of iron are disposed so as to surround the coil 7, completing the construction of the stator 5.

The stepping motor 1 constructed in this manner is mounted to an automobile continuously variable transmission, for example, and the operating member 22 attached to the tip portion of the rod 16 is engaged with a link 40 which opens and closes a transmission control valve in the continuously variable transmission.

When an electric current is passed through the external connector 25, the coils 7 are magnetized, rotating the rotor 6 and the shaft 4 together. The guide member 20 is engaged in the thread portion 4a on the shaft 4, and since rotation of the guide member 20 is regulated, rotation of the shaft 4 is converted into rectilinear motion of the guide member 20 and the rod 16.

The transmission control valve is opened and closed through the link 40 by reciprocation of the rod 16, ultimately changing the rotational velocity ratio between the drive shaft and the engine shaft.

The conventional stepping motor 1 is mounted to an automobile continuously variable transmission, for example, and is entirely immersed in the oil, which contains sulfur and organosulfur compounds. Furthermore, the coils 7 of the stators 5 are covered by the bobbins 53 and the outer moldings 54 which are composed of the thermoplastic resin, and the conducting wires 50 of the coils 7 are constructed by coating the copper wire 51 with the electrically-insulating layer 52, which is composed of the thermoplastic resin. For that reason, the sulfur and the organosulfur compounds in the oil permeate the bobbins 53 and the outer moldings 54, and in addition permeate the electrically-insulating layer 52, reaching the copper wire 51. As a result, chemical reactions occur at the surface of the copper wire 51 and organosulfur compounds are formed on the surface of the copper wire 51, giving rise to a state of decreased adhesive strength of the electrically-insulating layer 52 to the copper wire 51.

One problem has been that in this state, the electrically-insulating layer 52 may be breached due to interference between adjacent conducting wires 50 caused by repeated thermal expansion and thermal contraction due to the heat history of the conducting wires 50 themselves, leading to wire breakage or short circuiting between the conducting wires 50 caused by elution of copper due to electric potential differences between the conducting wires 50. Another problem has been that breaching of the electrically-insulating layer 52 of the conducting wires 50 is more likely at positions where the conducting wires 50 and the bobbins 53, which have different coefficients of thermal expansion, come into contact, leading to further short circuiting or wire breakage.

Yet another problem has been that when the temperature of the oil becomes greater than vaporization temperatures of volatile components in the oil due to heat generated by the coils 7, the electrically-insulating layer 52 of the conducting wires 50 is more likely to be permeated by sulfur, etc., and there is a greater likelihood of short circuiting occurring between the conducting wires 50.

SUMMARY OF THE INVENTION

The present invention aims to solve the above problems and an object of the present invention is to provide an electromagnetic device in which wire-breakage tolerance and short-circuiting tolerance of conducting wires are improved.

In order to achieve the above object, according to one aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding a conducting wire onto the bobbin, wherein the bobbin and the outer molding are composed of an electrically-insulating material resistant to permeation by sulfur compounds.

According to another aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding a conducting wire onto the bobbin, wherein the conducting wire is constituted by a copper wire, an electrically-insulating layer coated on the copper wire, and a protective layer coated on the electrically-insulating layer, the protective layer being composed of an electrically-insulating material resistant to permeation by sulfur compounds.

According to yet another aspect of the present invention, there is provided an electromotive device used in an oil, the electromagnetic device including:

an outer casing;

a moveable shaft supported by the outer casing;

a bobbin disposed inside the outer casing so as to be disposed around the moveable shaft on a common axis with the moveable shaft; and a coil embedded in an outer molding, the coil being constructed by winding a conducting wire onto the bobbin, wherein the conducting wire is constituted by a copper wire, a high-temperature solder layer coated on the copper wire, and a protective layer coated on the high-temperature solder layer, the protective layer being composed of an electrically-insulating material resistant to permeation by sulfur compounds.

The electrically-insulating material resistant to permeation by sulfur compounds may be a thermosetting resin.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

The preferred embodiments of the present invention will now be explained with reference to the drawings.

Embodiment 1

Figure 1:
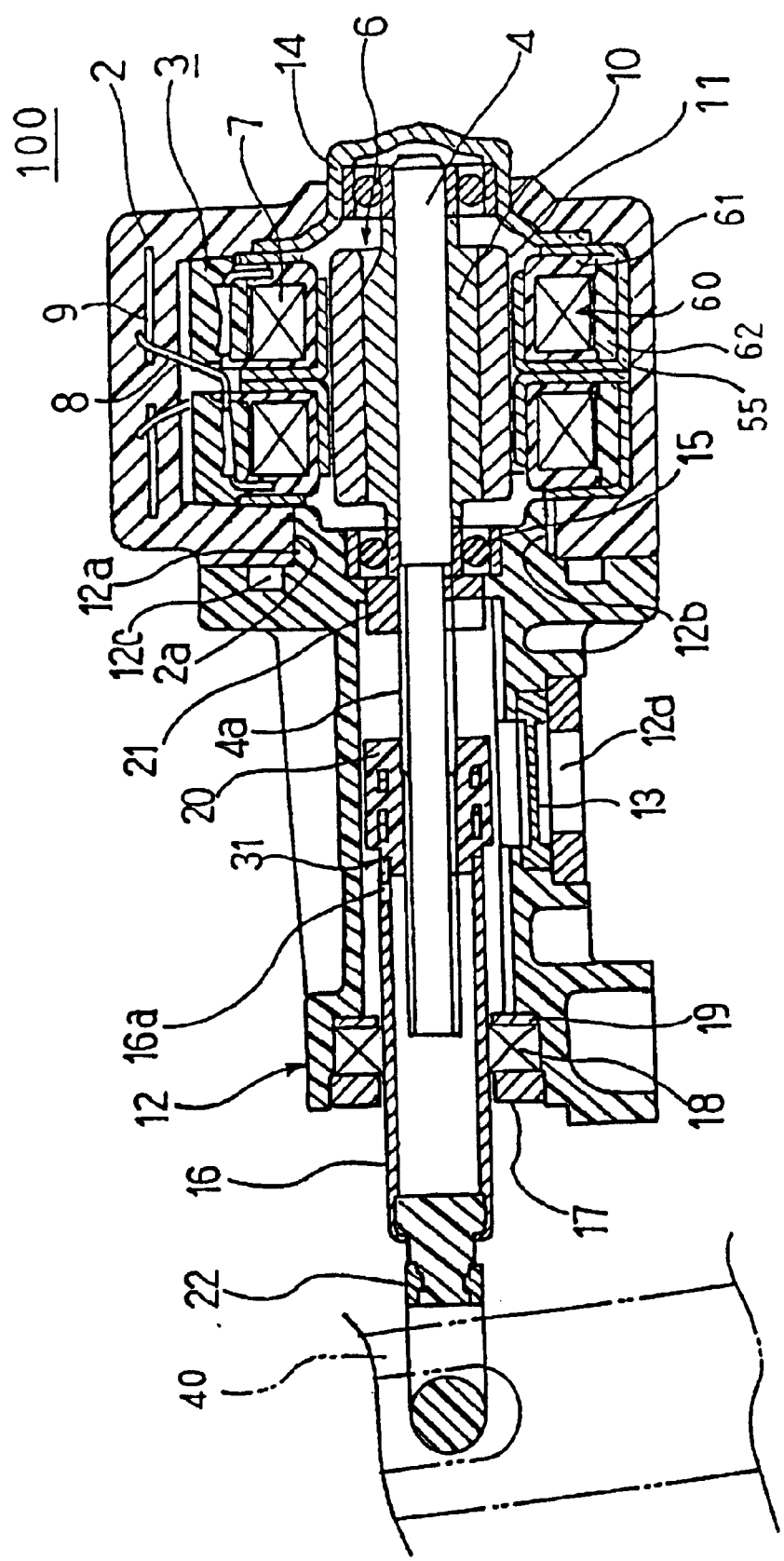
FIG. 1 is a cross section showing a stepping motor according to Embodiment 1 of the present invention.

FIG. 1 is a cross section showing a stepping motor according to Embodiment 1 of the present invention. Moreover, in the figure, portions which are the same as or correspond to those in the conventional stepping motor will be given the same numbering, and explanations thereof will be omitted.

In FIG. 1, coils 7 are each constructed by winding a conducting wire 50, formed by coating a copper wire 51 with an electrically-insulating layer 52, for a predetermined number of winds onto a bobbin 61 composed of an epoxy resin, which is a thermosetting resin functioning as an electrically-insulating material resistant to permeation by sulfur compounds. Then, end portions of the conducting wire 50 of each coil 7 are connected to coil terminals 8 mounted to the bobbin 61. Furthermore, the coils 7 wound onto the bobbins 61 are each embedded in an outer molding 62 composed of an epoxy resin, which is a thermosetting resin. In addition, cores 55 made of iron are disposed so as to surround the coil 7, constructing a stator 60. Then, two stators 60 are disposed surrounding a shaft 4 on a common axis with the shaft 4.

Moreover, the rest of the construction is the same as for the above conventional stepping motor 1.

Now, considering molecular structure, in contrast to thermoplastic resins, which are aggregates of straight-chain macromolecules, thermosetting resins have a reticulate cross-linked structure. Thus, the permeation of sulfur and organosulfur compounds, etc., is extremely low in thermosetting resins compared to thermoplastic resins.

In a stepping motor 100, which is an electromagnetic device constructed in this manner, because the coils 7 are embedded in the epoxy resin, which is a thermosetting resin, the amount of sulfur and the organosulfur compounds that permeate the bobbins 61 and the outer moldings 62 from the oil and reach the electrically-insulating layer 52 is significantly lowered. As a result, formation of sulfur compounds on a surface of the copper wire 51 resulting from chemical reactions between the sulfur and the copper wire 51 and between the organosulfur compounds and the copper wire 51 is suppressed, and reductions in adhesive strength of the electrically-insulating layer 52 to the copper wire 51 are suppressed.

Thus, even if there is interference between adjacent conducting wires 50 caused by repeated thermal expansion and thermal contraction due to the heat history of the conducting wires 50 themselves, damage to the electrically-insulating layer 52 is suppressed, and wire breakage and short circuiting between the conducting wires 50 caused by elution of copper due to electric potential differences between the conducting wires 50 are suppressed.

Furthermore, because damage to the electrically-insulating layer 52 of the conducting wire 50 at positions where the conducting wire 50 and the bobbins 61, which have different coefficients of thermal expansion, come into contact, is also suppressed, short-circuiting tolerance and wire-breakage tolerance of the conducting wire 50 is improved.

In addition, even if the temperature of the oil becomes greater than vaporization temperatures of volatile components in the oil due to heat generated by the coils 7, the likelihood of sulfur, etc., permeating the bobbins 61 and the outer moldings 62 and reaching the electrically-insulating layer 52 of the conducting wire 50 is reduced, ensuring the short-circuiting tolerance and the wire-breakage tolerance of the conducting wire 50.

Embodiment 2

Figure 2:
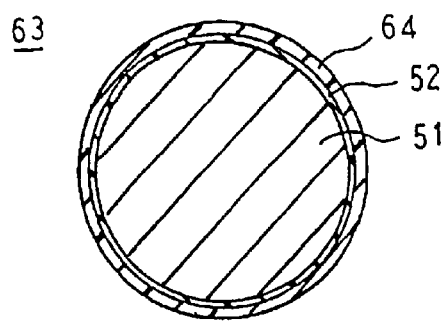
FIG. 2 is a cross section showing a conducting wire used in coils of a stepping motor according to Embodiment 2 of the present invention.

FIG. 2 is a cross section showing a conducting wire used in coils of a stepping motor according to Embodiment 2 of the present invention.

In FIG. 2, a conducting wire 63 is formed by additionally coating a protective layer 64 composed of epoxy resin, which is a thermosetting resin functioning as a electrically-insulating material resistant to permeation by the sulfur compounds, on the electrically-insulating layer 52 which is coated on the copper wire 51.

Moreover, the construction of Embodiment 2 is the same as in Embodiment 1 except for the fact that the conducting wire 63 is used in place of the conducting wire 50.

In Embodiment 2, because the protective layer 64, which has low permeability to the sulfur and organosulfur compounds, is coated on the electrically-insulating layer 52, the sulfur and organosulfur compounds permeating the bobbins 61 and the outer moldings 62 from the oil are blocked by the protective layer 64 from reaching the electrically-insulating layer 52.

Thus, according to Embodiment 2, because the amount of the sulfur and organosulfur compounds reaching the electrically-insulating layer 52 is further reduced compared to Embodiment 1, the short-circuiting tolerance and the wire-breakage tolerance of the conducting wire 50 are still further improved.

Now, in Embodiment 2 above, the bobbins 61 and the outer moldings 62 used are composed of the epoxy resin, which is an electrically-insulating material resistant to permeation by the sulfur compounds, but bobbins and outer moldings composed of any thermoplastic resin may be used. In that case, even if the sulfur and organosulfur compounds in the oil permeate the bobbins 61 and the outer moldings 62, because the sulfur and organosulfur compounds are blocked by the protective layer 64 from reaching the electrically-insulating layer 52, the short-circuiting tolerance and the wire-breakage tolerance of the conducting wire are improved compared to the conventional example.

Embodiment 3

Figure 3:
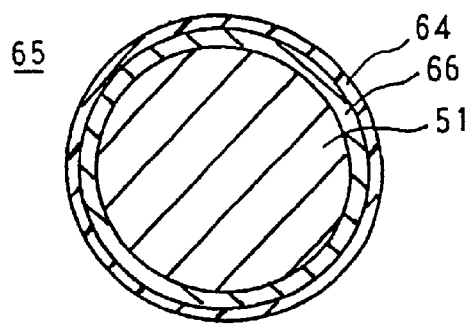
FIG. 3 is a cross section showing a conducting wire used in coils of a stepping motor according to Embodiment 3 of the present invention.
Figure 9:
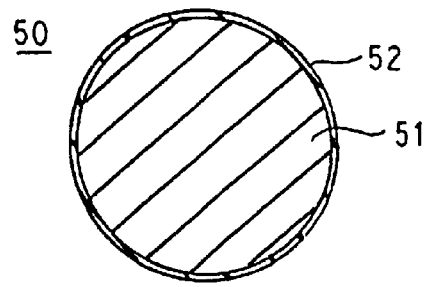
FIG. 9 is a cross section showing a conducting wires used in coils of the stepping motor in FIG. 5.
Figure 4:
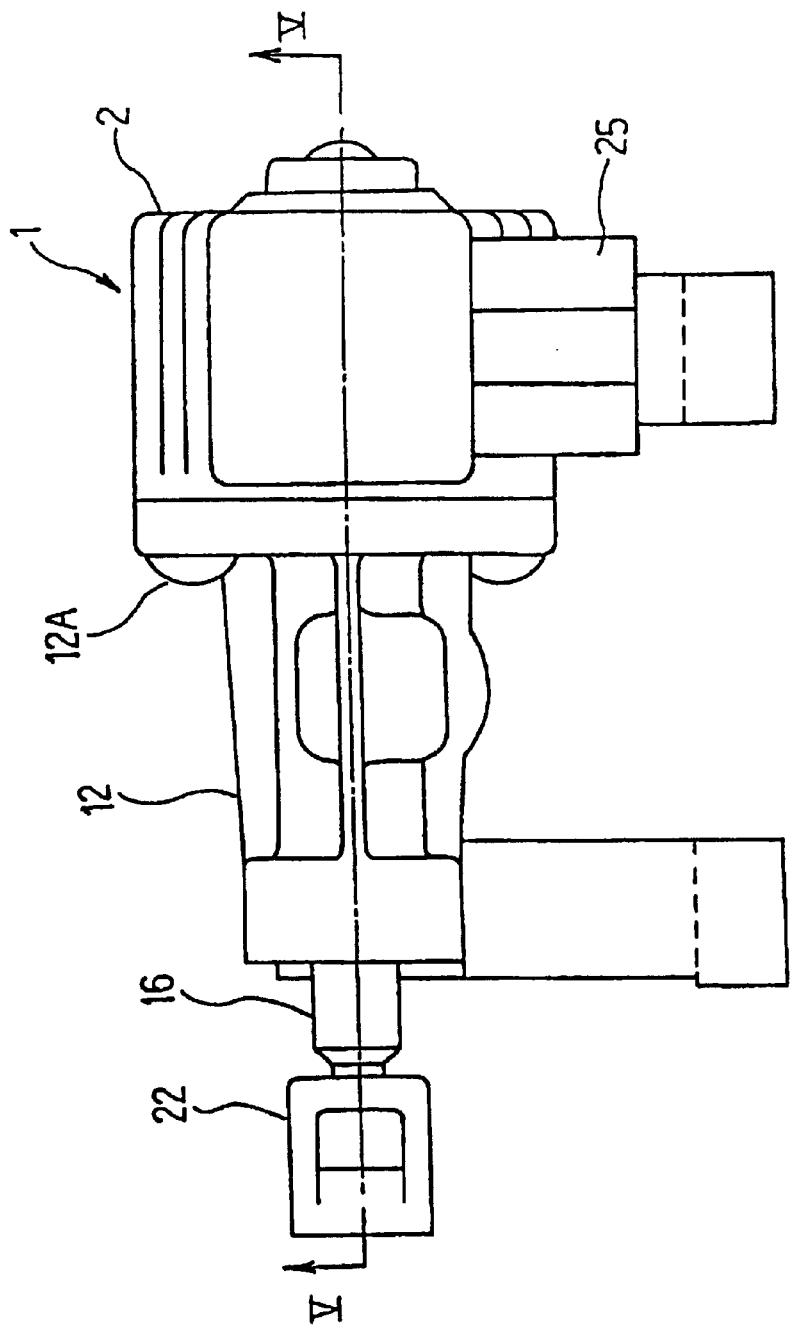
FIG. 4 is an external view of a conventional permanent-magnet stepping motor.
Figure 5:
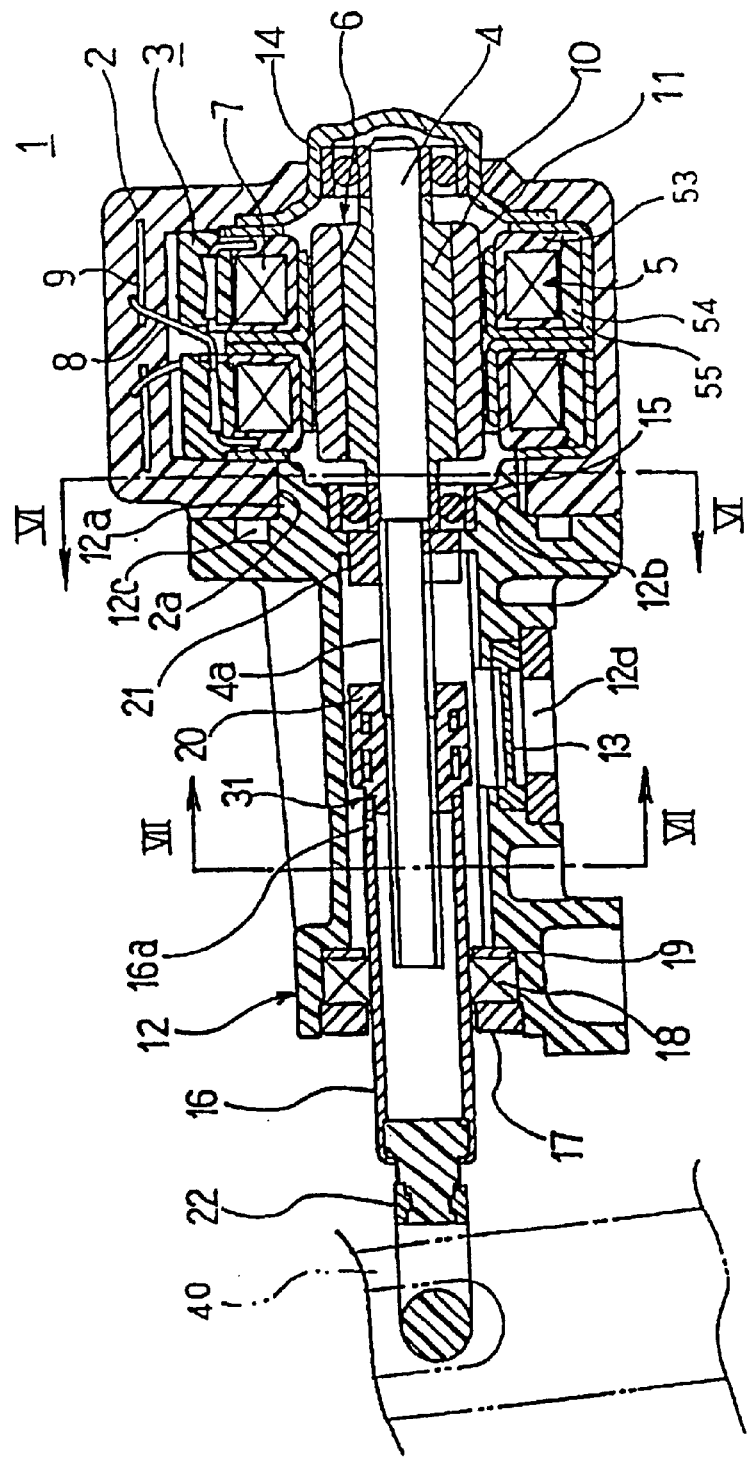
FIG. 5 is a cross section taken along line V—V in FIG. 4.
Figure 6:
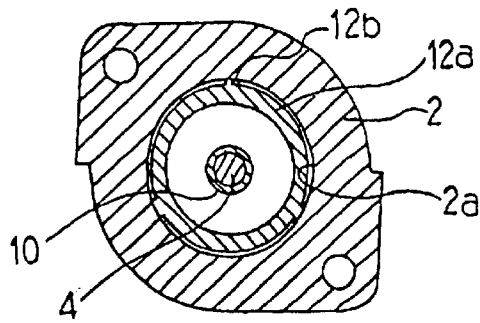
FIG. 6 is a cross section taken along line VI—VI in FIG. 5.
Figure 7:
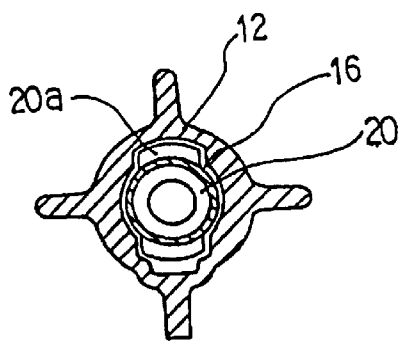
FIG. 7 is a cross section taken along line VII—VII in FIG. 5.
Figure 8:
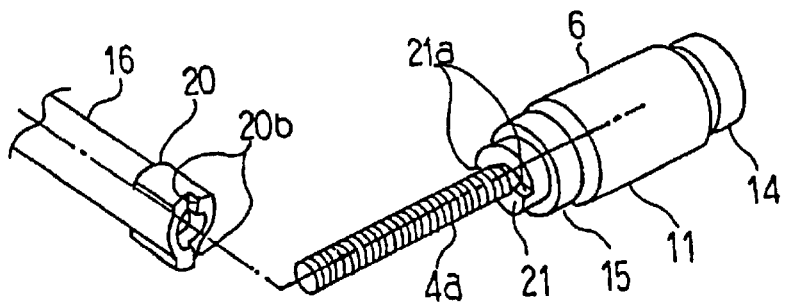
FIG. 8 is a partial exploded perspective of the stepping motor in FIG. 5.
Figure 10:
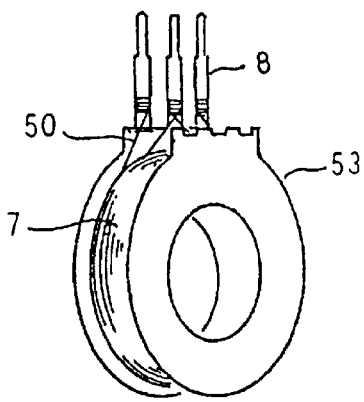
FIG. 10 is a perspective showing a wound state of the coils in a stator of the stepping motor in FIG. 5.
Figure 11:
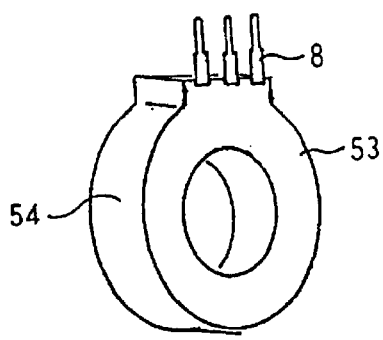
FIG. 11 is a perspective showing a molded state of a resin portion in the stator of the stepping motor in FIG. 5.
Figure 12:
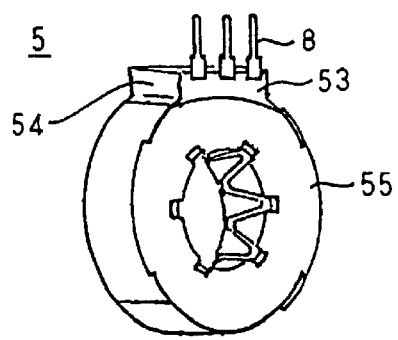
FIG. 12 is a perspective showing the stator of the stepping motor in FIG. 5.

FIG. 3 is a cross section showing a conducting wire used in coils of a stepping motor according to Embodiment 3 of the present invention.

In FIG. 3, a conducting wire 65 is formed by coating a high-temperature solder layer 66 onto the copper wire 51, and coating the protective layer 64 on the high-temperature solder layer 66. Here, a lead-rich tin-lead solder having 90 wt % or more of lead is used for the high-temperature solder layer 66.

Moreover, the construction of Embodiment 3 is the same as in Embodiment 1 except for the fact that the conducting wire 65 is used in place of the conducting wire 50.

In Embodiment 3, because the protective layer 64, which has low permeability to the sulfur and organosulfur compounds, is coated on the high-temperature solder layer 66, the sulfur and organosulfur compounds permeating the bobbins 61 and the outer moldings 62 from the oil are suppressed by the protective layer 64 from reaching the high-temperature solder layer 66. Then, any sulfur and organosulfur compounds which do permeate the protective layer 64 are prevented by the high-temperature solder layer 66 from reaching the copper wire 51. Now, the high-temperature solder is less likely to react with the sulfur and organosulfur compounds than copper. Thus, sulfur compounds are not formed on the surface of the high-temperature solder layer 66 as a result of chemical reactions between the sulfur and organosulfur compounds and the high-temperature solder layer 66 and there is no decrease in adhesive strength of the protective layer 64 to the high-temperature solder layer 66. As a result, the short-circuiting tolerance and the wire-breakage tolerance of the conducting wire 65 are still further improved.

Now, in Embodiment 3 above, the bobbins 61 and the outer moldings 62 used are composed of the epoxy resin, which is an electrically-insulating material resistant to permeation by the sulfur compounds, but bobbins and outer moldings composed of any thermoplastic resin may be used. In that case, even if the sulfur and organosulfur compounds in the oil permeate the bobbins 61 and the outer moldings 62, because they are blocked by the protective layer 64 and the high-temperature solder layer 66 from reaching the copper wire 51, the short-circuiting tolerance and the wire-breakage tolerance of the conducting wire are improved compared to the conventional example.

Moreover, each of the above embodiments has been explained using an epoxy resin, which is a material having low permeability to sulfur and organosulfur compounds, that is, an electrically-insulating material resistant to permeation by sulfur compounds, but any thermosetting resin may be used as an electrically-insulating material resistant to permeation by sulfur compounds, for example, a phenol resin.

Each of the above embodiments has been explained with reference to stepping motors, but the present invention is not limited to stepping motors; it may be applied to any electromagnetic device used in an oil, for example, to a solenoid valve for controlling the action of a transmission mechanism for adjusting the rotational velocity ratio between a drive shaft and an engine shaft by regulating an oil channel using a movable valve to control oil flow rate or pressure.

In Embodiment 3 above, the high-temperature solder layer 66 is formed using tin-lead solder having 90 wt % or more of lead, but it is not necessary for the lead content in the tin-lead solder to be 90 wt % or more; the lead content need only be 60 wt % or more.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

This electromotive device of the present invention is constituted as described above. Thus, this electromotive device has the following effects.

According to one aspect of the present invention, there is provided an electromotive device used in an oil, the electromotive device including:
  an outer casing;
  a moveable shaft supported by the outer casing;
  a bobbin disposed inside the outer casing so as to be disposed around the moveable shaft on a common axis with the moveable shaft; and
  a coil embedded in an outer molding, the coil being constructed by winding a conducting wire onto the bobbin,
  wherein the bobbin and the outer molding are composed of an electrically-insulating material resistant to permeation by sulfur compounds, preventing wire breakage or short circuiting between conducting wires resulting from sulfur and organosulfur compounds in the oil permeating the bobbin and the outer molding and reaching the conducting wire, thereby providing an electromagnetic device enabling improved short-circuiting tolerance and wire-breakage tolerance in the conducting wire.

According to another aspect of the present invention, there is provided an electromotive device used in an oil, the electromagnetic device including:
  an outer casing;
  a moveable shaft supported by the outer casing;
  a bobbin disposed inside the outer casing so as to be disposed around the moveable shaft on a common axis with the moveable shaft; and
  a coil embedded in an outer molding, the coil being constructed by winding a conducting wire onto the bobbin,
  wherein the conducting wire is constituted by a copper wire, an electrically-insulating layer coated on the copper wire, and a protective layer coated on the electrically-insulating layer, the protective layer being composed of an electrically-insulating material resistant to permeation by sulfur compounds, preventing wire breakage or short circuiting between conducting wires resulting from sulfur and organosulfur compounds in the oil permeating the bobbin and the outer molding and reaching the copper wire, thereby providing an electromagnetic device enabling improved short-circuiting tolerance and wire-breakage tolerance in the conducting wire.

According to yet another aspect of the present invention, there is provided an electromotive device used in an oil, the electromagnetic device including:
  an outer casing;
  a moveable shaft supported by the outer casing;
  a bobbin disposed inside the outer casing so as to be disposed around the moveable shaft on a common axis with the moveable shaft; and
  a coil embedded in an outer molding, the coil being constructed by winding a conducting wire onto the bobbin,
  wherein the conducting wire being constituted by a copper wire, a high-temperature solder layer coated on the copper wire, and a protective layer coated on the high-temperature solder layer, the protective layer being composed of an electrically-insulating material resistant to permeation by sulfur compounds, preventing wire breakage or short circuiting between conducting wires resulting from sulfur and organosulfur compounds in the oil permeating the bobbin and the outer molding and reaching the copper wire, thereby providing an electromagnetic device enabling improved short-circuiting tolerance and wire-breakage tolerance in the conducting wire.

The electrically-insulating material resistant to permeation by sulfur compounds may be a thermosetting resin, facilitating formation of the bobbin, the outer molding, and the protective layer.

What is claimed is:

1. An electromagnetic device used in an automotive transmission, said electromagnetic device comprising:
  an outer casing;
  a moveable shaft supported by said outer casing;
  a bobbin disposed inside said outer casing so as to be disposed around said moveable shaft on a common axis with said moveable shaft;
  a coil embedded in an outer molding, said coil being constructed by winding a conducting wire onto said bobbin,
  a high-temperature metallic solder layer coated on said conducting wire; and a protective layer coated on said high-temperature metallic solder layer;

wherein said protective layer is an electrically-insulating material resistant to permeation by sulfur compounds; and wherein said high-temperature metallic solder layer suppresses reduction in adhesive strength between the protective layer and the conducting wire, wire breakage, and short circuiting between said conducting wires.

2. The electromagnetic device according to claim 1, wherein said electrically-insulating material resistant to permeation by sulfur compounds is a thermosetting resin.

3. The electromagnetic device according to claim 1, wherein the high-temperature metallic solder layer comprises a tin-lead solder.

4. The electromagnetic device according to claim 1, wherein the high-temperature metallic solder layer consists of a tin-lead solder, wherein a weight percentage of lead in said tin-lead solder is 90 wt % or more.

5. The electromagnetic device according to claim 1, wherein the high-temperature metallic solder layer consists of a tin-lead solder, wherein a weight percentage of lead in said tin-lead solder is 60 wt % or more.

* * * * *